US012762487B2

(12) United States Patent
Pole et al.

(10) Patent No.: US 12,762,487 B2
(45) Date of Patent: Oct. 13, 2026

(54) SYSTEM AND METHOD FOR OPTIMIZING ALLOCATION OF CLOUD DESKTOPS BASED ON USAGE PATTERNS

(71) Applicant: Workspot, Inc., Campbell, CA (US)

(72) Inventors: Anushree Kunal Pole, Sunnyvale, CA (US); Amitabh Bhuvangyan Sinha, San Jose, CA (US); Jimmy Chang, Mountain View, CA (US); Shiva Prasad Madishetti, Frisco, TX (US); Virabrahma Prasad Krothapalli, San Jose, CA (US); David T. Sulcer, Pacifica, CA (US)

(73) Assignee: WORKSPOT, INC., Campbell, CA (US)

( * ) Notice: Subject to any disclaimer, the term of this patent is extended or adjusted under 35 U.S.C. 154(b) by 34 days.

(21) Appl. No.: 18/458,857

(22) Filed: Aug. 30, 2023

(65) Prior Publication Data

US 2025/0077999 A1 Mar. 6, 2025

(51) Int. Cl.
*G06Q 10/06* (2023.01)
*G06F 9/451* (2018.01)
*G06Q 10/0631* (2023.01)

(52) U.S. Cl.
CPC ....... *G06Q 10/06313* (2013.01); *G06F 9/452* (2018.02)

(58) Field of Classification Search
CPC ...................................................... G06Q 10/06
See application file for complete search history.

(56) References Cited

U.S. PATENT DOCUMENTS 10,075,459 B1 * 9/2018 Suryanarayanan .......................... H04L 63/1416
2011/0131589 A1 * 6/2011 Beaty ...................... H04L 67/10 718/1
2014/0032651 A1 * 1/2014 Singh ...................... H04L 67/10 709/204
2014/0258446 A1 * 9/2014 Bursell ............... G06F 9/45558 709/217

(Continued)

FOREIGN PATENT DOCUMENTS

WO WO-2020190256 A1 * 9/2020 ........... G06F 9/5005

OTHER PUBLICATIONS

Zhen Xiao, Weijia Song, and Qi Chen, Dynamic Resource Allocation using Virtual Machines for Cloud Computing Environment, IEEE Transaction on Parallel and Distributed Systems. vol. 24, No. 6 Year 2013. (Year: 2013).*

*Primary Examiner* — Kurtis Gills
(74) *Attorney, Agent, or Firm* — NIXON PEABODY LLP

(57) ABSTRACT

A system and method for assigning hosts to provide Cloud desktops to client devices of users is disclosed. The system includes available host servers for providing Cloud desktops to client devices of users. A monitoring service is coupled to the available host servers. The monitoring service collects usage data from the users of the Cloud desktops. A host allocation engine is coupled to the monitoring service and available host servers. The host allocation engine receives a request for a cloud desktop from a user. The host allocation engine determines usage data for the user requesting the cloud desktop. The host allocation engine allocates a host server from the available host servers based on the usage data of the user.

15 Claims, 12 Drawing Sheets

Host Allocation based on Usage Pattern

(56) References Cited

U.S. PATENT DOCUMENTS

| | | | | |
|---|---|---|---|---|
| 2015/0365291 | A1* | 12/2015 | Burton | H04L 67/306 709/226 |
| 2016/0094622 | A1* | 3/2016 | Thomas | H04L 41/22 709/203 |
| 2016/0337221 | A1* | 11/2016 | Cohen | H04L 12/283 |
| 2017/0139738 | A1* | 5/2017 | Kim | G06F 9/452 |
| 2018/0205600 | A1* | 7/2018 | Burton | H04L 67/1097 |
| 2019/0114086 | A1* | 4/2019 | Andrew | G06F 3/0608 |
| 2020/0322453 | A1* | 10/2020 | Said | H04L 67/1097 |

* cited by examiner

SYSTEM AND METHOD FOR OPTIMIZING ALLOCATION OF CLOUD DESKTOPS BASED ON USAGE PATTERNS

TECHNICAL FIELD

The present disclosure relates generally to network-based virtual desktop systems. More particularly, aspects of this disclosure relate to a system that optimizes allocation of cloud based desktops or cloud based applications to different hosts based on usage patterns.

BACKGROUND

Computing systems that rely on applications operated by numerous networked computers are ubiquitous. Information technology (IT) service providers thus must effectively manage and maintain very large-scale infrastructures. An example enterprise environment may have many thousands of devices and hundreds of installed software applications to support. The typical enterprise also uses many different types of central data processors, networking devices, operating systems, storage services, data backup solutions, cloud services, and other resources. These resources are often provided by means of cloud computing, which is the on-demand availability of computer system resources, such as data storage and computing power, over the public internet or other networks without direct active management by the user.

Users of networked computers such as in a cloud-based system may typically log into a computer workstation or client device and are provided a desktop application that displays an interface of applications and data available via the network or cloud. Such desktop applications will be initially accessed when a user logs in, but may remain active to respond to user operation of applications displayed on the desktop interface. While users may activate the desktop application on any computer on the network, most users work from one specific computer.

Cloud-based remote desktop virtualization solutions or remote application virtualization have been available for over a decade. These solutions provide virtual desktops and or virtual applications to network users with access to public and/or private clouds. In cloud-based remote desktop virtualization offerings, there is typically a capability of associating a remote desktop virtualization template in a particular cloud region with a remote desktop virtualization pool in the same cloud region as part of the general configuration model. This remote desktop virtualization template is customized with the image of the right desktop or application for a particular remote desktop or application virtualization use case.

A cloud desktop service system provides cloud desktops that are allocated from public or private cloud providers. For clarity, in this context the term cloud desktop also encompasses providing access to remote virtual applications running on a shared application server. In some cases, the cloud provider and cloud region are already selected. Users of cloud desktops access a computer desktop, or specific desktop application, using a local endpoint device. Users often work in shifts, and each cloud desktop exists within a non-virtual computer known as a host. Some cloud providers may expose the existence of hosts and require that use of a host not be shared between multiple customers, for licensing or other reasons. For that or other reasons a cloud desktop service system may need to manage the allocation of virtual machines onto specific hosts.

Users sometimes work in a known work pattern, referred as a shift, in which a group of users concentrates their desktop or application usage over a limited number of hours during a limited number of days. Each user may be assigned certain shifts. Customers may require multiple shifts requiring the use of cloud desktops. One example is providing 24×7 coverage, as a call center might need.

A user may start working (connect to a desktop) before their shift begins or may end working (disconnect from the desktop) after their shift ends. By understanding the nature of shifts for a customer, information not available to cloud service providers, it is possible to predict future demand for desktops.

FIG. 1A illustrates a chart 10 depicting two configured shifts in a common weekly calendar. As shown in the chart 10, ideally, a morning shift shown as the bars 12 request desktops during the times of the morning shift, and an evening shift shown as bars 14 request desktops during the times of an evening shift. In this idealized view, day shift worker usage shown as bars 12 never overlaps with evening shift workers shown as bars 14.

However, in reality, shift workers may connect to the Cloud desktop before their configured shift begins, or may disconnect after the shift ends. FIG. 1B shows an example chart 20 of how shift workers sharing the same pool of cloud desktops may overlap their usage time. In this example, a bar 22 represents usage times for a morning shift worker, while bars 24 represent usage times for an evening shift worker. As may be seen in FIG. 1B, the actual usage pattern deviates from the ideal pattern in FIG. 1A. In particular, that around the shift boundary time (4 pm) a mix of workers from different shifts may request access to a cloud desktop.

Each virtual Cloud desktop, or Cloud application service, exists within a host server. The host server often will contain multiple desktops. Typically, a host can support a maximum number of cloud desktops at any given time, without impacting user experience. When the maximum number of Cloud desktops is exceeded, the performance of the desktops will be affected. For example, exceeding the maximum number of Cloud desktops supported by a host may be experienced as lag time, or inability to process jobs within an expected time interval, or some other failure of applications executed by the Cloud desktop.

In order to accommodate a dynamically changing demand for cloud desktops, a cluster of dedicated hosts may be managed together, where the size of the cluster is the number of hosts. FIG. 2 shows a typical prior art cluster 40. The cluster 40 includes multiple hosts 42, 44, and 46. Each host 42, 44, and 46 may contain virtual cloud desktops, and is typically a physical (non-virtual) computer such as a server. Using virtualization technology, virtual cloud desktops 48 are manifested and made available to users. There is some maximum capacity of each host in terms of how many cloud desktops may be hosted, and how much CPU and memory may be utilized. There is typically an engine 50 that may balance the load of Cloud desktops 48 across the multiple hosts 42, 44, and 46 in the cluster 40. The engine 50 performs the balancing based on resource utilization (memory and CPU), sometimes controlled by metrics such as mean scheduler wait time.

The activity of moving a Cloud desktop from one host to another can negatively impact user experience because of the delay of instantiating the Cloud desktop on the new host. Ideally, a Cloud desktop is allocated to a host one time and is not moved to another host. Further, if more hosts are maintained than are needed, this can negatively affect the cost of desktop services. This is true even if desktops are paused or deallocated when not being actively used. Ideally, the minimum number of hosts is allocated for use by the number of Cloud desktops required, and additional hosts, if needed for a short period of time, are disassociated from the cluster when they are no longer needed and freed up for other processing.

In the prior art, when a new cloud desktop is needed, typically it is allocated to some host in the cluster that has capacity to create the new cloud desktop while maintaining user experience requirements. If a new host is required, it may be allocated only when needed, and deallocated or disassociated from the cluster when no longer used. Demand for CPU and memory may be dynamic, so before a host becomes overloaded, the system may migrate some cloud desktops between cluster hosts in order to balance the Cloud desktop load between the cluster hosts.

FIG. 3 is an example prior art logic flow involved in allocating and load balancing cloud desktops within a cluster based on host utilization. The process first determines that a Cloud desktop is needed (60). The engine 50 compares the request for a Cloud desktop to the existing cluster such as the cluster 40. The engine 50 decides whether a new host is needed (62). For example, if there is not sufficient capacity in any existing host in the cluster, the engine 50 may determine that a new host must be allocated. The host is then allocated by the engine 50 (64). If there is sufficient capacity in an existing host, the host is identified by the engine 50 (66). Once the host has been identified (and possibly created) a cloud desktop is allocated on that host and made available to the user (66).

Periodically (or continuously) the utilization of each host in the cluster is monitored (68). The process determines whether a host is overloaded (70). If there is no overload, the process returns to monitoring the hosts. If a host is overloaded, the process will notify the allocation engine. If a cluster becomes unbalanced with more Cloud desktops on a particular host, the cluster/host allocation engine 50 may migrate one or more virtual desktops to a different host in the cluster to balance the hosts.

The presently known system also periodically (or continuously) deallocates, or disassociates unneeded (empty) hosts with the cluster. Such hosts may be freed and thus be used to execute other operations. Because the cluster/host allocation engine 50 illustrated in FIGS. 3-4 does not consider usage patterns such as worker shifts, there may be cases in which the number of hosts allocated to the hosts in a cluster is not optimal.

In the example of overlapping shifts, an outgoing shift worker may disconnect before the current shift end time, or sometime after the end time. Furthermore, an incoming shift worker may connect before or after the next shift start time. Both these situations may lead to hosts not being deallocated from the cluster because certain hosts are still providing Cloud desktops to current shift and incoming shift workers may be allocated a Cloud desktop to one of the existing hosts.

To illustrate how this could lead to hosts not being deallocated from the cluster, FIG. 4 shows a graph 70 that describes one such scenario in a cluster with four hosts 72, 74, 76, and 78. In this scenario there are 100 shift workers in an outgoing shift, and 100 shift workers for the following shift. Each host (Hosts 1, 2, 3, and 4) 72, 74, 76, and 78 has a capacity of 50 cloud desktops, so logically, it should be possible to operate with two hosts for most of the time.

As shown in FIG. 4, at 20 minutes before end of a shift, the cluster/host allocation engine 50 in FIG. 3 does not have awareness that hosts 72 and 74 (Host 1 and Host 2) are affiliated with any particular shift. Therefore, evening shift workers joining early are allocated to these same hosts 72 and 74, blending the cloud desktops with the hosts of the day shift workers.

Later, when more workers from the evening shift begin needing cloud desktops, most of them are allocated to hosts 76 and 78 (Hosts 3 and 4). However, the early evening shift workers are still associated with hosts 72 and 74 (Hosts 1 and Host 2). This makes it difficult for the system to deallocate Host 1 and Host 2 and leaves a total of four hosts, double the ideal allocation of two hosts, even though there is capacity for all the evening shift workers on hosts 76 and 78 (Host 3 and Host 4). Thus, the system maintains capacity for 200 workers at all times, even though it is used by shifts of 100 workers at a time. In this case, the prior art load balancing engine will not perform load balancing to free up hosts 72 and 74 (Host 1 and Host 2). Even if load balancing occurs, this may cause an impact to user experience while the virtual desktops are migrated between hosts.

Thus, there is a need for a load balancing engine that incorporates predicted usage patterns in load balancing of hosts for provision of cloud desktops. There is also a need for a system that minimizes migration of Cloud desktops to different hosts.

SUMMARY

One disclosed example is a cloud desktop system that includes available host servers for providing cloud desktops to client devices of a set of users. The system includes a monitoring service coupled to the available host servers. The monitoring service is operable to collect usage data from the users provided with cloud desktops via the client devices. The system includes a host allocation engine coupled to the monitoring service and available host servers. The host allocation engine operable to receive a request for a cloud desktop from a user. The engine determines usage data for the user requesting the cloud desktop. The engine allocates a host server from the available host servers based on the usage data of the user.

In another implementation of the disclosed example system, the usage profile is one of several usage profiles. At least one of the usage profiles is associated with each of the users. In another implementation, the usage data is a shift defining a work period that the user uses the cloud desktop. In another implementation, one of the host servers of the plurality of host servers is dedicated to the user. In another implementation, the usage factors include seasonable usage. In another implementation, the usage factors include the role of the user. In another implementation, the users are classified as part of a shift with other users. In another implementation, a user classified as part of a shift may be dynamically associated with another shift. In another implementation, the available servers include at least one idle server and at least one active server providing cloud desktops. The allocation of servers is based on minimizing the number of active servers of the servers.

Another disclosed example is a method for assigning a cloud desktop to one of a plurality of hosts. Usage data are collected for users of cloud desktops provided by the hosts. At least one usage pattern is determined based on collected usage data. A request for a cloud desktop is received from a user. The cloud desktop to allocated to one of the hosts based on usage pattern associated with the user.

In another implementation of the disclosed example method, the usage profile is one of several usage profiles. At least one of the usage profiles is associated with each of the users. In another implementation, the usage data is a shift defining a work period that the user uses the cloud desktop. In another implementation, one of the host servers of the plurality of host servers is dedicated to the user. In another implementation, the usage data is a shift defining a work period that the user uses the cloud desktop. In another implementation, one of the host servers is dedicated to the user. In another implementation, the usage factors include seasonable usage. In another implementation, the usage factors include the role of the user. In another implementation, the users are classified as part of a shift with other users. In another implementation, a user classified as part of a shift may be dynamically associated with another shift. In another implementation, the available servers include at least one idle server and at least one active server providing cloud desktops. The allocation of servers is based on minimizing the number of active servers of the servers.

Another disclosed example is a non-transitory computer-readable medium having machine-readable instructions stored thereon, which when executed by a processor, cause the processor to collect usage data for a plurality of users of cloud desktops provided by the plurality of hosts. The instructions cause the processor to determine at least one usage pattern based on collected usage data. The instructions cause the processor to receive a request for a cloud desktop from a user. The instructions cause the processor to allocate the cloud desktop to one of the plurality of hosts based on usage pattern associated with the user.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1A:
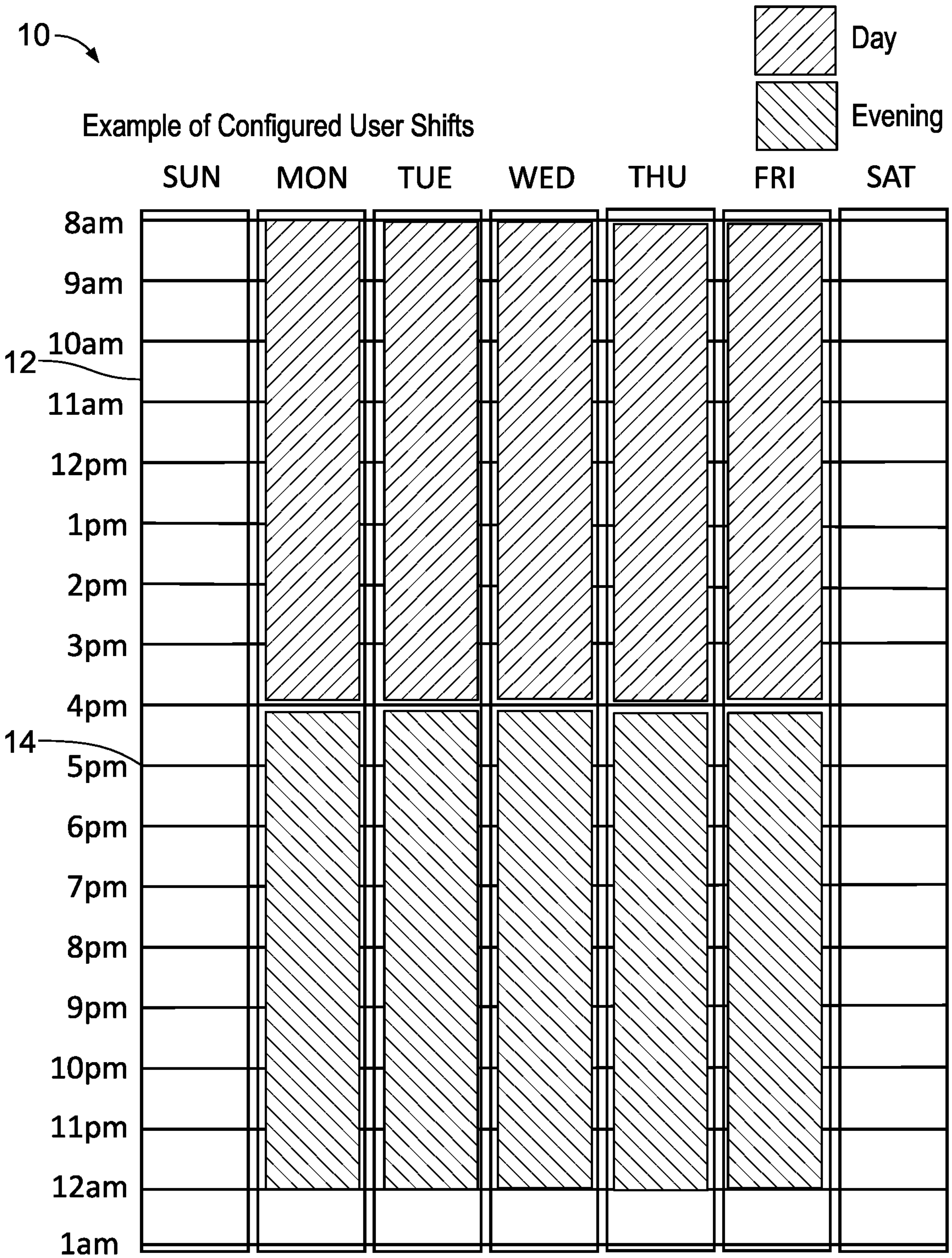
FIG. 1A (PRIOR ART)
FIG. 1A is a chart showing idealized usage of Cloud desktops between two work shifts in a prior art system.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a method and system to allow a cluster of hosts to make a better original allocation of cloud desktops and/or cloud applications by affiliating the allocation according to usage patterns of cloud desktop users. The example cloud desktop service system collects and maintains configuration information for the users of the cloud desktops. For example, such information may relate users to work shifts and cloud desktops to the users. The system also collects and analyzes actual usage connection data. The system incorporates the user information to ensure that hosts are allocated in a more optimal manner to provide cloud desktops.

Figure 5:
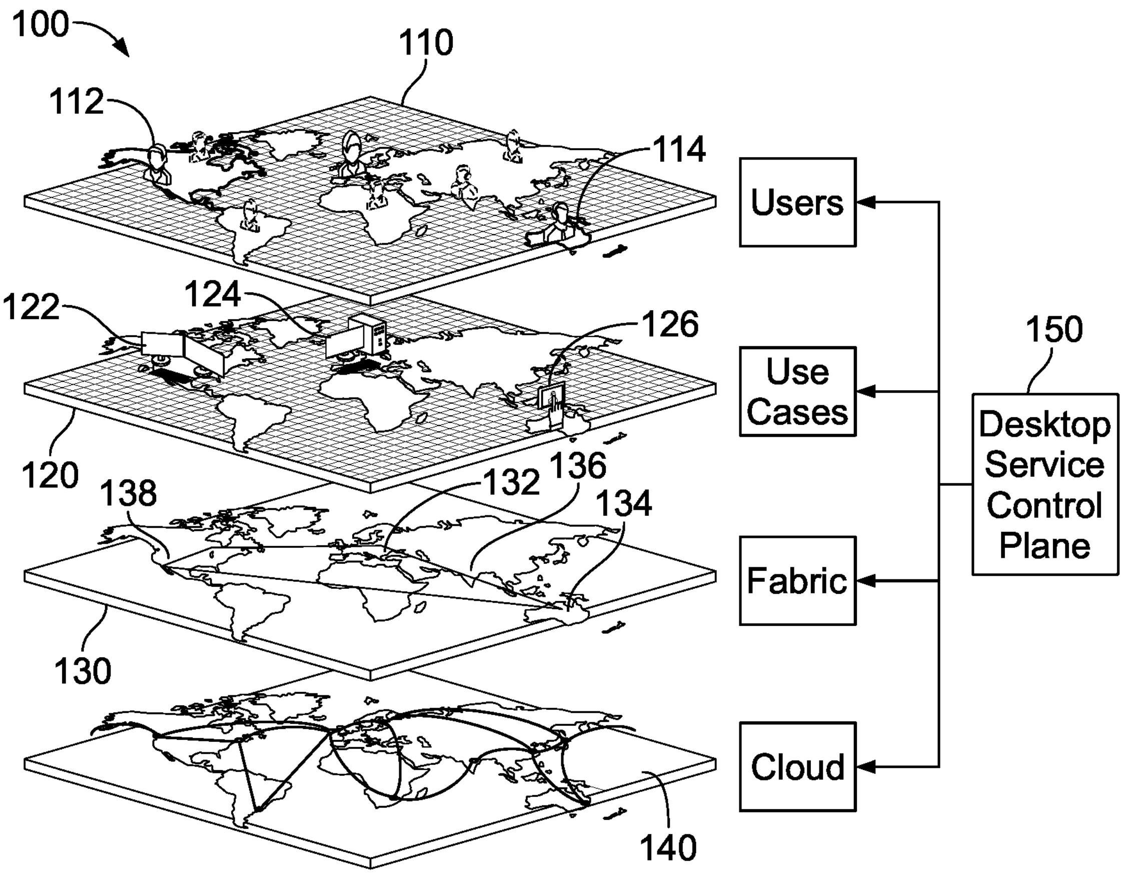
FIG. 5 is a high-level block diagram illustrating an example Cloud based system allowing access to virtual desktops from different cloud providers.

FIG. 5 shows a high level block diagram of a cloud desktop service system 100. The cloud desktop service system 100 may also be referenced as a global desktop system because it provides virtual desktops for users globally. Alternatively, the cloud desktop service system 100 may provide cloud based applications to users. The cloud desktop service system 100 includes four layers, a users layer 110, a use cases layer 120, a fabric layer 130, and a Cloud layer 140.

The users layer 110 represents desktop users having the same computing needs, that may be located anywhere in the world. In this example, the users layer 110 includes users 112 and 114, who are in geographically remote locations and access desktops via computing devices.

The use cases layer 120 represents common global pools of Cloud desktops available to serve the users, whereby each global pool is based on a common desktop template. There can be multiple global pools based on which groups users belong to and their job requirements. In this example, the pool for the users 112 and 114 may be one of a developer desktop pool 122, an engineering workstation pool 124, or a call center application pool 126. The desktops each include configuration and definitions of resources necessary to offer the Cloud desktop. The use cases layer 120 represents common logical pools of desktops available to serve the users, whereby each logical pool may be based on common desktop requirements. There can be multiple logical pools based on which groups users belong to and their job requirements. In this example, the pool for the users 112 and 114 may be one of a developer desktop pool 122, an engineering workstation pool 124, or a call center application pool 126. The cloud desktops each include configuration and definitions of resources necessary to offer the cloud desktop. The desktops in a particular pool may each be supported by different cloud regions based on the requirement of the desktop pool.

For example, pools such as the developer desktop pool 122 or the engineering workstation pool 124 allow users in the pool a cloud desktop that allows access to graphic processing unit (GPU) based applications. Other example applications may include those applications used for the business of the enterprise, for example, ERP (enterprise resource planning) applications or CRM (customer relationship management) applications. These applications allow users to control the inventory of the business, sales, workflow, shipping, payment, product planning, cost analysis, interactions with customers, and so on. Applications associated with an enterprise may include productivity applications, for example, word processing applications, search applications, document viewers, and collaboration applications. Applications associated with an enterprise may also include applications that allow communication between people, for example, email, messaging, web meetings, and so on.

The fabric layer 130 includes definitions and configurations for infrastructure and desktop service resources, including gateways, desktop templates, and others that are applied to cloud regions. The resources are maintained as cloud regions such as Cloud regions 132, 134, 136, and 138. The cloud regions can be added or removed as needed.

The Cloud layer 140 implements the resources defined by the use case layer 120 and fabric layer 130, including virtual cloud desktops, infrastructure, and other virtual resources, all of which are virtual machines or other virtual resources hosted in a public cloud.

Figure 3:
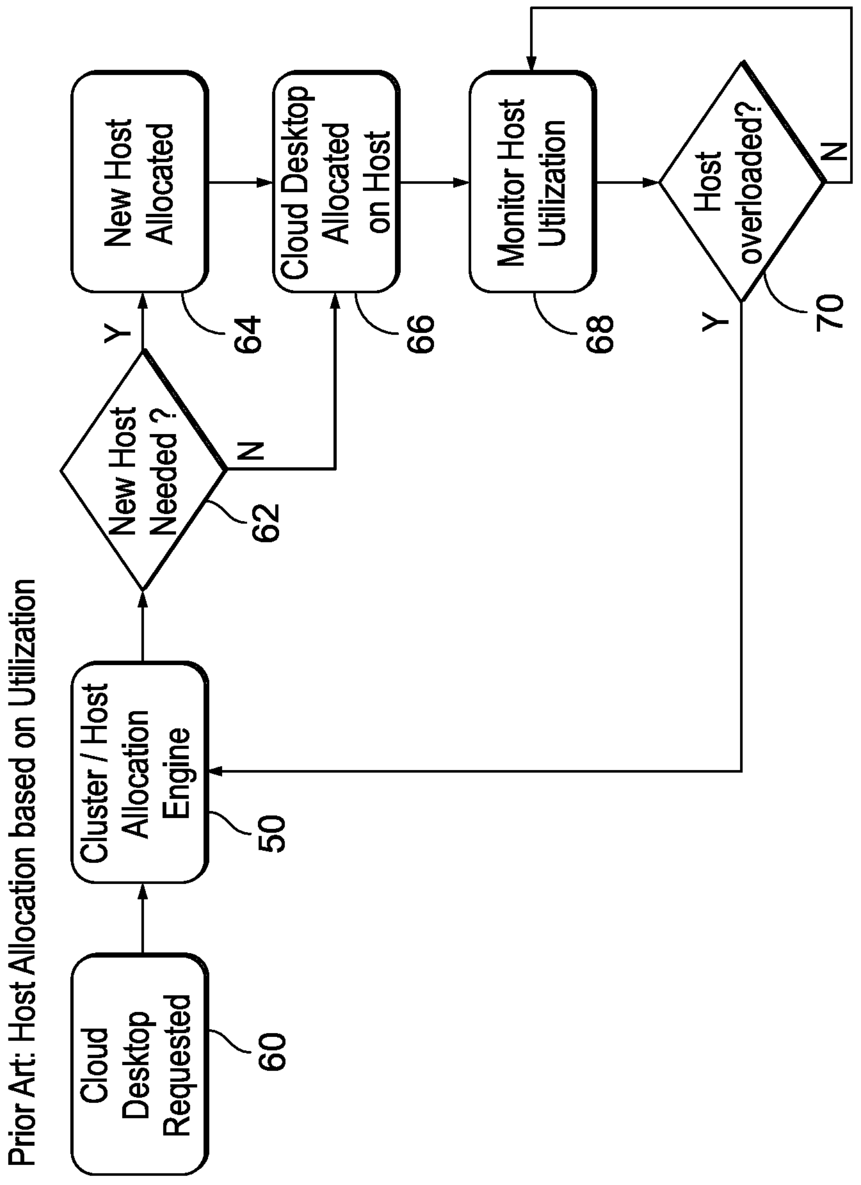
FIG. 3 (PRIOR ART)
FIG. 3 is a process diagram of prior art balancing of hosts in a cluster.

The layers 110, 120, 130, and 140 are created and orchestrated by a desktop service control plane 150 that can touch all the layers. The desktop service control plane 150 is a key component to orchestrate a cloud desktop service system such as the cloud desktop service system 100 in FIG. 3. The desktop service control plane 150 can manage the entire lifecycle of a Cloud desktop service implementation, from creating and managing the required Cloud desktops, to monitoring and analyzing the stream of operational data collected, enforcing security policies, and optimizing the experience for IT administrators and cloud desktop users. For example, the desktop service control plane 150 may register a set of a virtual networks, virtual storage resources, and more. Within a virtual network, the control plane 150 may further register and coordinate the use of gateways, enterprise connectors, desktop templates, connection brokers, and more.

The two desktop users 112 and 114 in different parts of the world who are each able to access an example high-performance Cloud desktop service from the Cloud desktop service system 100. Users, such as users 112 and 114, each may use a client device to access the cloud desktop service. Client devices may be any device having computing and network functionality, such as a laptop computer, desktop computer, smartphone, or tablet. Client devices execute a desktop client to access remote applications such as the desktop. The client application authenticates user access to the applications. A client device can be a conventional computer system executing, for example, a Microsoft™ Windows™-compatible operating system (OS), Apple™ OS X, and/or a Linux distribution. A client device can also be a client device having computer functionality, such as a personal digital assistant (PDA), mobile telephone, tablet, video game system, etc. In this example, the client application displays an icon of the desktop or desktops available to the user. As will be explained, the cloud desktop is made available to the user through the client application on the user device.

Figure 1B:
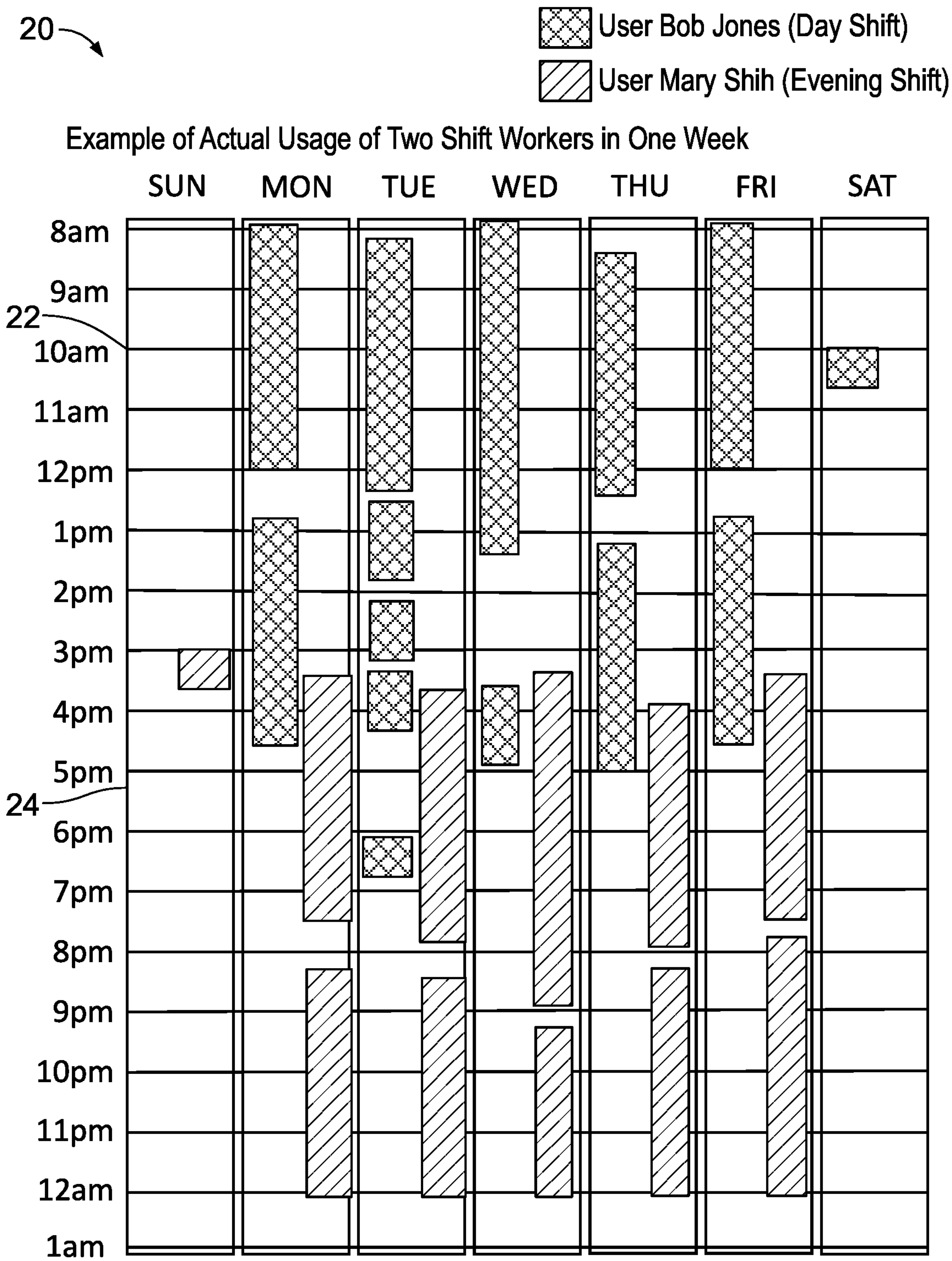
FIG. 1B (PRIOR ART)
FIG. 1B is a chart showing actual usage of Cloud desktops between two workers belonging to different work shifts in a prior art system.
Figure 2:
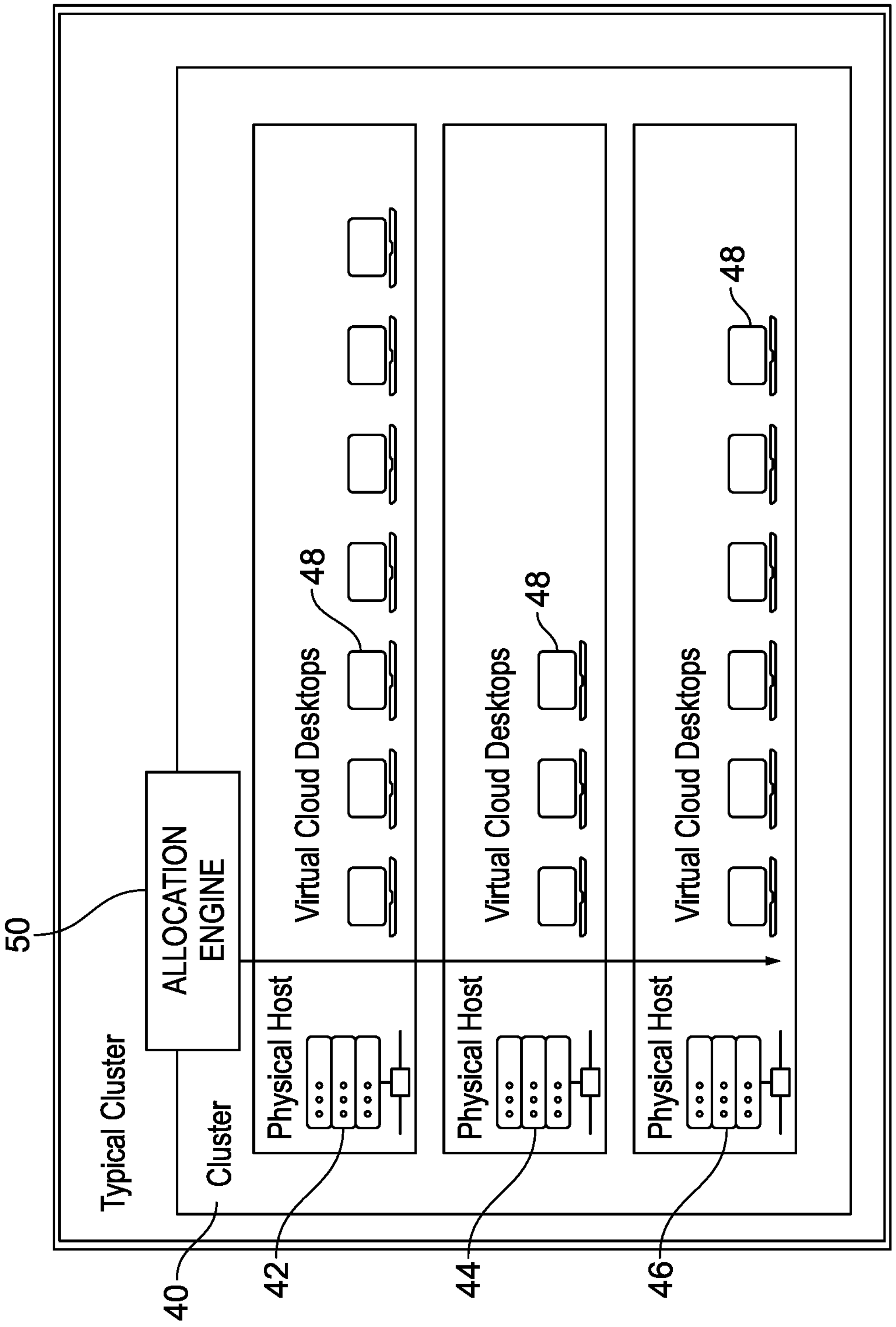
FIG. 2 (PRIOR ART)
FIG. 2 is a block diagram of a prior art cluster of hosts providing Cloud desktops.
Figure 6:
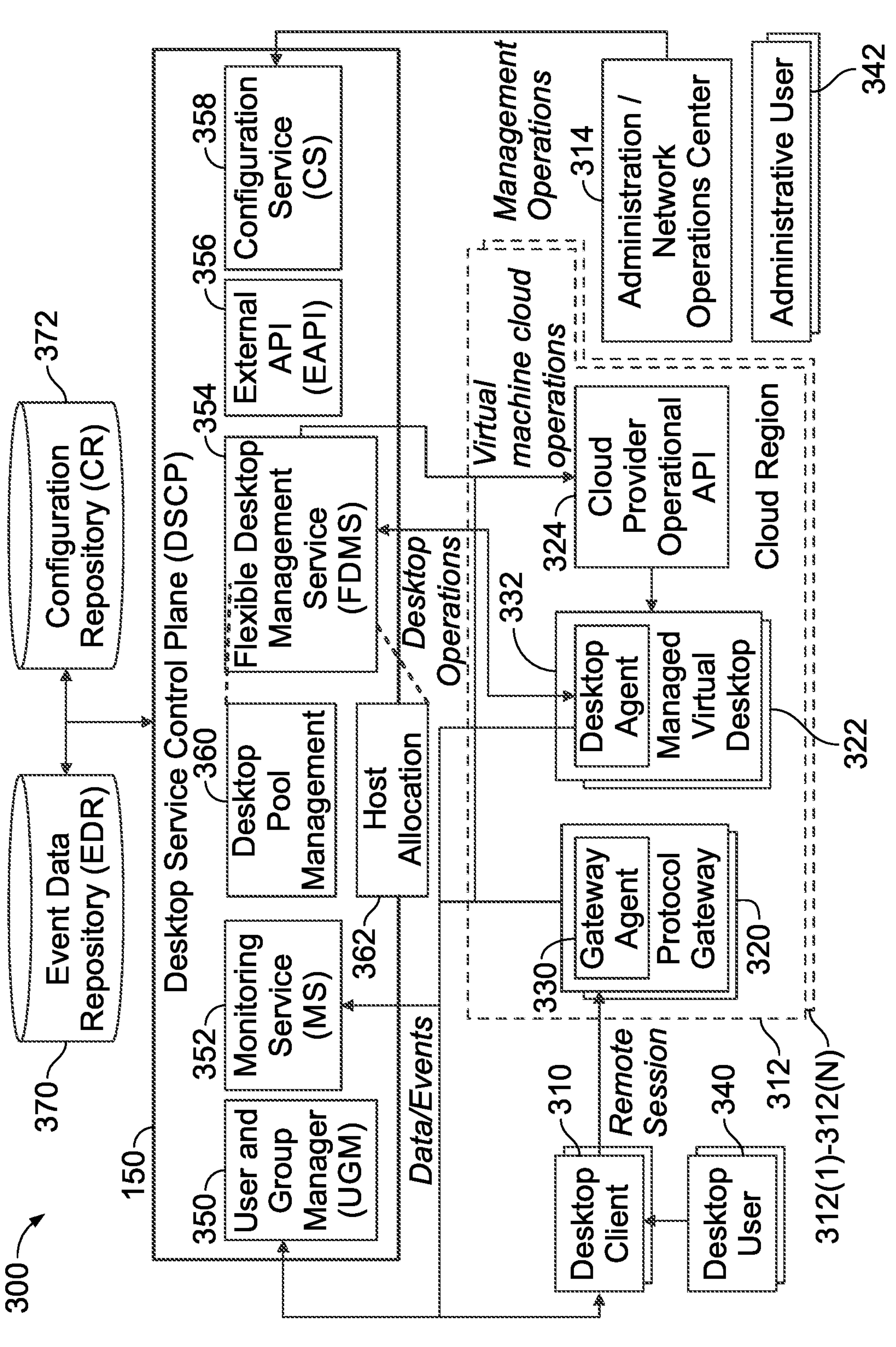
FIG. 6 is a block diagram of a Cloud region and desktop service control plane of the example Cloud desktop fabric in FIG. 1.

FIG. 6 is a block diagram of some examples of components of the Cloud desktop service system 100, including an example set of desktop clients 310, a Cloud region 312, and an administration center 314, that interact with and can be orchestrated by the desktop service control plane 150. The desktop client 310 communicates with the desktop service control plane 150 in order to be registered with the fabric, assigned a desktop, remotely configured, and for other purposes. One other purpose is to monitor latency, response-time, and possibly other data and events that measure quality of user experience. Another purpose is to report user interaction events. There may be multiple Cloud regions (e.g., cloud regions 312(1) to 312(N)) similar to the Cloud region 312, but only one Cloud region 312 is shown in detail for simplicity of explanation. The Cloud region 312 may include a set of protocol gateways 320, a set of managed virtual desktops 322, and a cloud service provider operational API 324. These components all communicate with the desktop service control plane 150. The Cloud region 312 may be one of the Cloud regions 132, 134, 136, and 138 in FIG. 1.

Such Cloud regions include a cluster of host servers that host the various applications as well as appropriate storage capabilities, such as virtual disks, memory, and network devices. Thus, the Cloud region 312 typically comprises IT infrastructure that is managed by IT personnel. The IT infrastructure may include servers, network infrastructure, memory devices, software including operating systems, and so on. If there is an issue related to an application reported by a user, the IT personnel can check the health of the infrastructure used by the application. A Cloud region may include a firewall to control access to the applications hosted by the Cloud region. The firewall enables computing devices behind the firewall to access the applications hosted by the Cloud region, but prevents computing devices outside the firewall from directly accessing the applications. The firewall may allow devices outside the firewall to access the applications within the firewall using a virtual private network (VPN).

The protocol gateway 320 may be present to provide secure public or internal limited access to the managed Cloud desktops, that may be deployed on a virtual machine of its own. A gateway agent 332 is software that is deployed on that gateway virtual machine by the desktop service control plane 150, and serves to monitor the activity on the gateway 320, and enable the desktop service control plane 150 to assist in configuration and operations management of the gateway 320.

The example desktop client 310 is software and device hardware available in the local environment of a desktop user 340 to remotely access a managed Cloud desktop using a remote desktop protocol. The desktop client 310 communicates with the desktop service control plane 150 to monitor latency, response-time, and other metrics to measure quality of user experience and also supports a remote display protocol in order for users to connect to a desktop application run by the Cloud region 312.

The managed cloud desktop 322 is itself provisioned and maintained by the desktop service control plane 150. A desktop template may be used to manage pools of such managed Cloud desktops. The desktop template is used to instantiate cloud desktops with the correct virtual machine image and a standard set of applications for a particular use case. A desktop agent such as desktop agent 330 is software that is deployed on that managed cloud desktop by the desktop service control plane 150, and serves to monitor the activity on the managed cloud desktop, and enable the desktop service control plane 150 to assist in configuration and operations management of the managed Cloud desktop.

The cloud service provider operational application programming interface (API) 324 presents services provided by the cloud service provider that also participate in the management of the virtual machine. This can be utilized by a desktop service control plane 150 to perform operations like provisioning or de-provisioning the virtual machine. As will be explained the desktop service control plane 150 includes a cluster/host allocation engine that assigns cloud desktops provided by the cloud region 312 to different host servers.

Administrative users 342 can interact with operations reporting interface software at the administration center 314 that allows management and administration of the desktop service control plane 150.

Other components and services may interact with the desktop service control plane but are omitted from FIG. 6 for simplicity, such as enterprise connectors, network monitoring services, customer relationship management (CRM) systems, and many others.

The desktop service control plane 150 itself can perform many internal centralized functions also not depicted in in FIG. 6, including pool management, user and group management, cloud service adapters, virtual desktop templates, data analysis, high-availability management, mapping users to the optimal cloud region, security policy management, monitoring, compliance, reporting, and others.

The control plane 150 includes a user and group manager 350, a monitoring service 352, a desktop management service (DMS) 354, an external API (EAPI) 356, and a configuration service (CS) 358. The control plane 150 may access an event data repository 370 and a configuration repository 372. Although only one cloud region 312 is shown in detail, it is to be understood that the control plane 150 may facilitate numerous cloud regions.

The monitoring service 352 makes both routine and error events available to administrators and can analyze operational performance and reliability. The monitoring service 352 interacts with components including the desktop client 310, desktop agent 330, gateway agent 332 to obtain operational data relating to the desktop, and operational data generated by the control plane 150 itself. The monitoring service 352 stores all such operational data for later analysis. As will be explained desktop clients may report information about the location of the user. Desktop agents can report information about the duration of each connection, and other performance information, including the applications used by the desktop. Gateway agents can also report performance information because the gateway agent sits between the desktop client and the desktop on the network.

The desktop management service 354 interacts with the one or more managed virtual machines (MVMs) 322 in the cloud region 312 and other regional cloud regions 312(1) to 312(N). In this example, the desktop management service 354 manages resources for providing instantiated Cloud desktops to the users in the logical pools, orchestrating the lifecycle of a logical desktop. As will be explained, the management service 354 includes a desktop pool resource management engine 360 and a host allocation engine 362. The desktop pool resource management engine 360 determines the requirements for desktop pools and the constraints of the regional cloud regions for optimal allocation of desktops in the desktop pool, and may use the data collected by the monitoring service to determine optimal allocation of virtual desktops. The cluster/host allocation engine 362 assigns cloud desktops provided by the cloud region 312 to different host servers. The host allocation engine 362 includes a balancing routine that takes into account usage patterns to efficiently assign host servers to provide cloud desktops to new users.

The administration center 314 works directly with the data control plane 150 as its primary human interface. The administration center 314 allows the administrative user 342 to configure the functions of the control plane 150 through the configuration service 358. The configuration service 358 supports editing and persistence of definitions about the desktop service, including subscription information and policies. The administration center 314 may be where the desktop requirement dimensions are configured by the administrative user 342. The system 300 in FIG. 6 allows the creation and management of desktop pools in accordance with the process described herein.

As explained above, the host allocation engine 362 in FIG. 6 collects usage information for the cloud based desktops such as the cloud desktop made available by the desktop client 310 to the desktop user 340. The example cloud desktop service system 300 collects and maintains configuration information (for example, relating users to shifts, and cloud desktops to users). The system 300 also collects and analyzes actual usage connection data (as illustrated above).

For example, when user Mary Shih requests a cloud desktop, the system 300 may know that: the request is for user Mary Shih; and Mary Shih is an evening shift worker (both by configuration, and/or by historical usage pattern data). For example, when user Mary Shih was registered with the control plane 150, configuration information about planned shift hours, type of desktop required, a prioritized list of cloud regions, and other relevant facts are stored in configuration repository 372. Furthermore, the control plane 150 may have access to all the event data stored event data repository 370 that may be associated with past activity of the user, including login and logout times, applications used, and utilization metrics including memory, CPU, disk, and bandwidth consumed. This information may be considered while the example host allocation engine 362 is determining which host server upon which to allocate the cloud desktop for Mary Shih.

Figure 7:
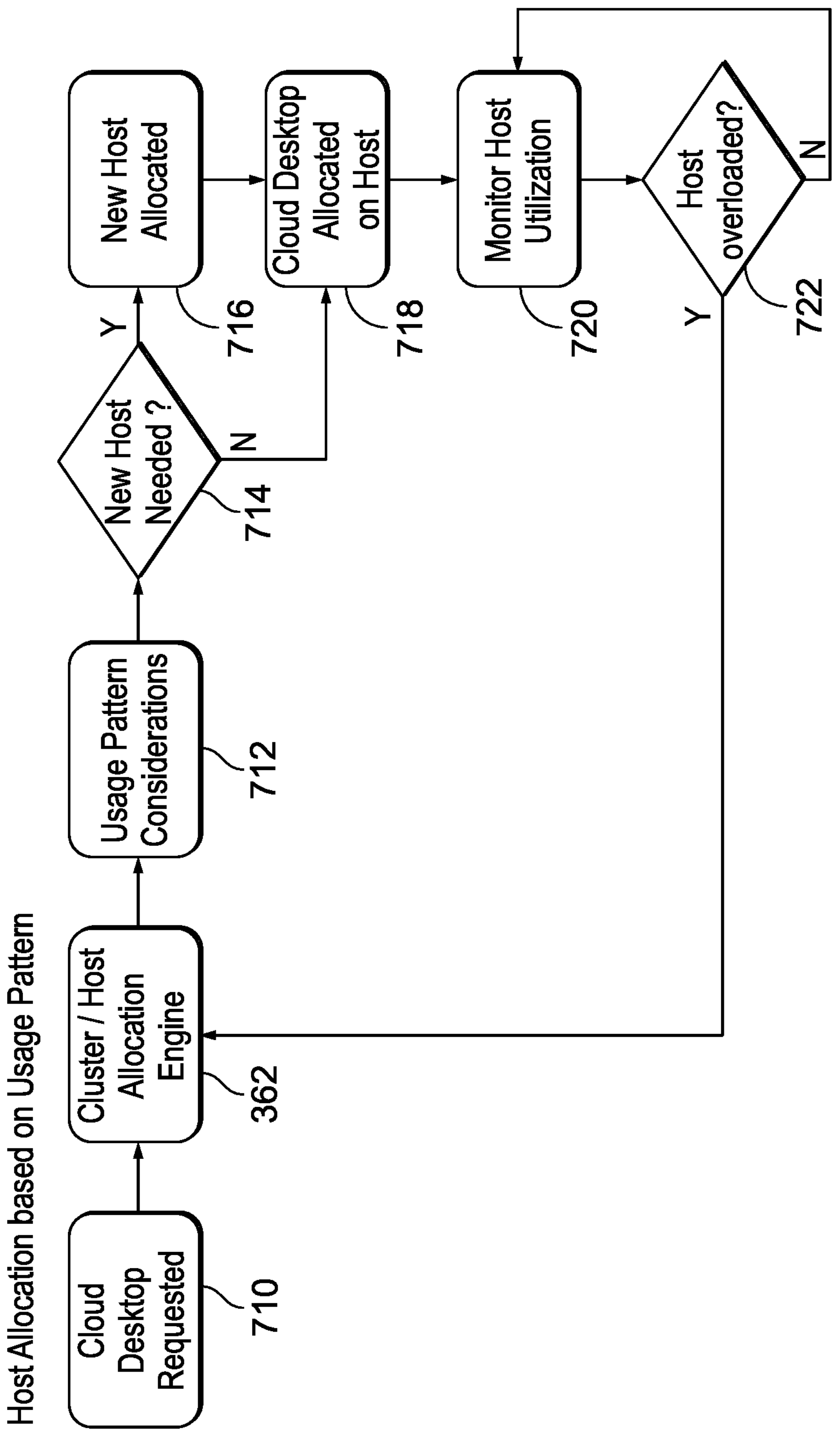
FIG. 7 is a flow diagram of a routine to ensure balancing among a set of hosts considering actual usage of Cloud desktops.

FIG. 7 shows the process of allocation of cloud desktops to hosts in a cluster. The process first determines that a cloud desktop is needed such as a client device user requesting access to a Cloud desktop (710). The engine 336 then analyzes usage pattern considerations such as the identity of the user, the corresponding work shift of the user, and other usage patterns (712). The engine 362 compares the request for a cloud desktop to the availability of existing cluster or clusters of hosts supporting cloud desktops.

The engine 362 decides whether a new host is needed to accommodate the request for a new cloud desktop (714). For example, if there is not sufficient capacity in any pre-allocated host in the cluster, the engine 326 may determine that a new host must be allocated. The additional host is then allocated by the engine 326 (716). If there is sufficient capacity in a pre-allocated host for the new cloud desktop (714), the pre-allocated host is identified by the engine 326 (716). Once the host has been identified or allocated (716) a cloud desktop is allocated on the identified and created host and subsequently made available to the user (718).

Periodically (or continuously) the utilization of each host in the cluster is monitored (720). The process determines whether a host is overloaded (722). If there is no overload, the process returns to monitoring the hosts. If a host is overloaded, the process will notify the allocation engine 362. If a cluster becomes unbalanced with more Cloud desktops on a particular host, the cluster/host allocation engine 362 may migrate one or more virtual desktops to a different host in the cluster to balance the hosts.

At potential times of overlapping desktop formation, since, based on the usage patterns, the host allocation engine 362 knows that the request for the cloud desktop is actually for someone who will be part of a following shift, the engine 362 can avoid allocating a cloud desktop from a host that will otherwise be able to be deallocated from the cluster once the current shift is completely over. This saves resources in minimizing the time required for the additional host.

Figure 4:
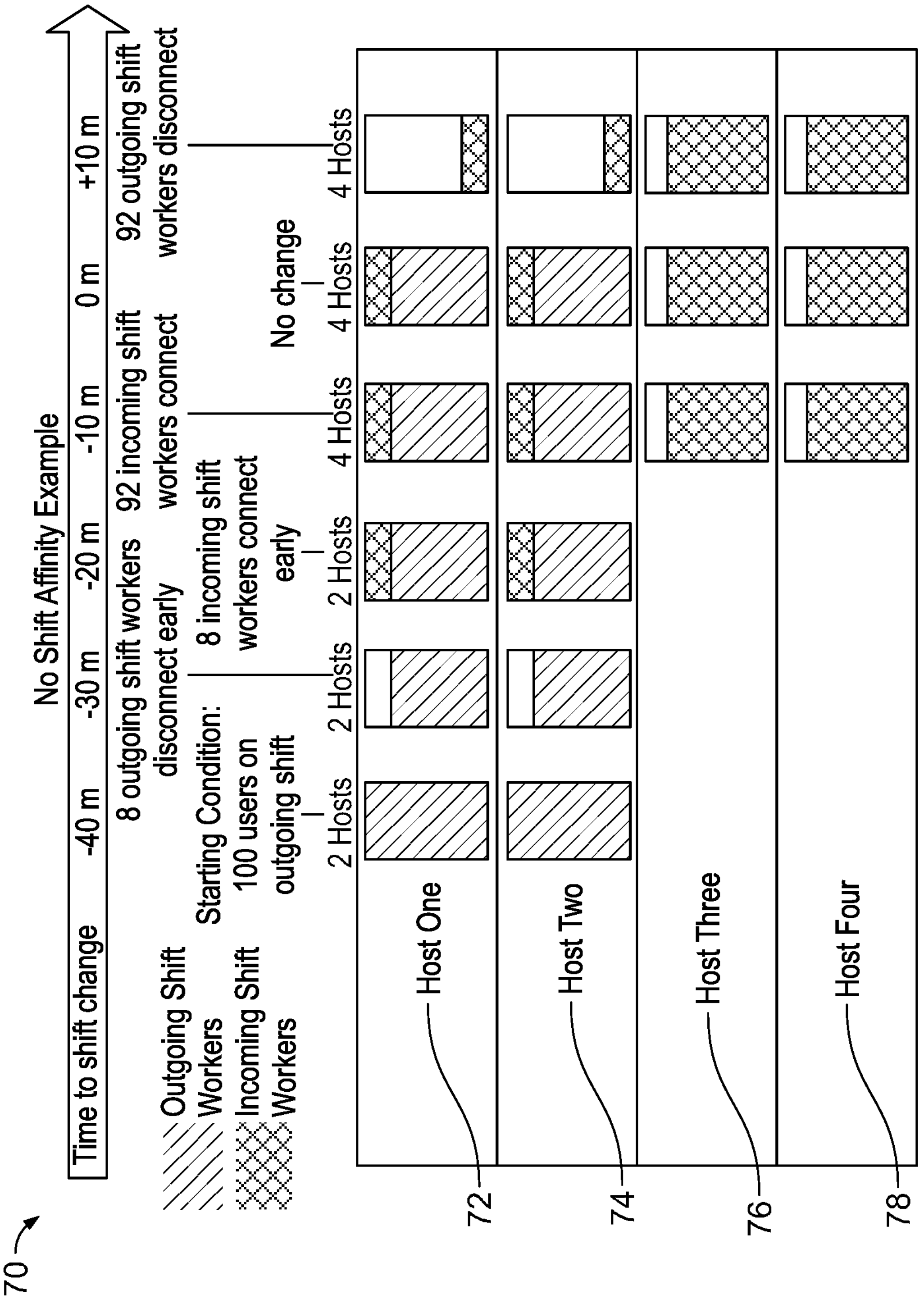
FIG. 4 (PRIOR ART)
FIG. 4 is a chart of allocation of Cloud desktops in a prior art cluster system between different shifts.
Figure 8:
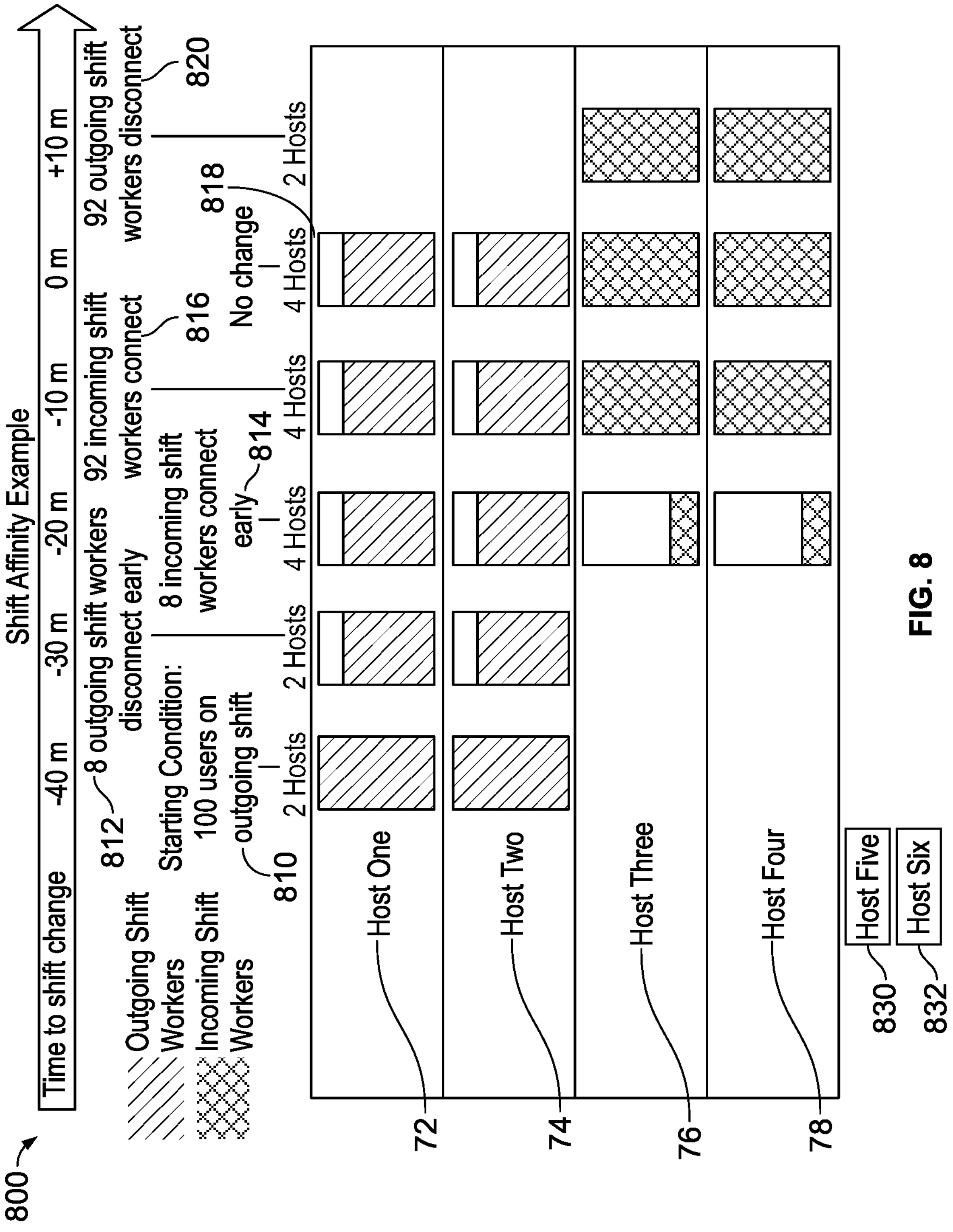
FIG. 8 is a chart of allocation of Cloud desktops in an example system between different shifts using the example balance engine incorporating usage data.

To illustrate this, the example of allocating hosts for overlapping shifts of workers requesting cloud desktops shown in FIG. 4 may be revised to reflect the incorporation of the usage pattern data as shown in FIG. 8. FIG. 8 shows the hosts 72, 74, 76, and 78 in relation to the number of cloud desktops provided near a change in shift times. The example cluster includes additional hosts 830 and 832. A first time period 810 during a first shift shows that all cloud desktops are allocated to the hosts 72 and 74. A second time period 812 represents the time near the end of the first shift where various workers log out of their cloud desktops provided by the hosts 72 and 74. During a third time period 814, early arriving workers start logging on and additional cloud desktops are allocated to hosts 76 and 78 based on the usage data of the early arriving workers. The cloud desktops being allocated to the hosts 76 and 78 are based on the prediction that the arrived workers will require desktops for the duration of the second shift.

A fourth time period 816 right before the end of the first shift, shows the first shift workers beginning to log off from the cloud desktops provided by the hosts 72 and 74. Most of the workers of the second shift log on and request cloud desktops. The engine allocates hosts 76 and 78 to provide such desktops based on the usage data of the newly logging on workers. At the end of the first shift and the beginning of the second shift represented by a time period 818. Many first shift workers are logging off from cloud desktops provided by the hosts 72 and 74. All second shift workers logging on are provided cloud desktops from the hosts 76 and 78 based on usage patterns. At a final time period 820 representing the second shift, all desktops are provided by the hosts 76 and 78. Once the day shift workers have all disconnected in time period 820, the hosts 72 and 74 may be reclaimed for maintenance or for other jobs, and the allocated host count is reduced back to two.

Additional hosts 830 and 832 are unallocated in this scenario, but may be made available for special user needs or as a backup if one of the other hosts requires service. Alternatively, the additional hosts 830 and 832 may be allocated to perform other operations or provisional other types of cloud desktops.

The key points to note are at the time point of 20 minutes before shift end 814, the system is aware that cloud desktop requests are from incoming shift workers. Effectively the balancing routine can track an affinity between the hosts 72 and 74 (Hosts 1 and 2) with the day shift exclusively. Instead of co-mingling the new cloud desktops, the engine allocates new hosts 76 and 78 (Hosts 3 and 4) to have an affinity to the workers of the evening shift. This temporarily creates over-allocation of hosts to give a count of four hosts earlier than in the earlier example without shift affinity.

Over time, the example method of balancing hosts based on analysis of usage will avoid maintaining under-loaded hosts for long periods of time, at the cost of temporary periods of maintaining excess hosts. If a worker lingers long beyond their shift, preventing the host from being freed up, the cloud desktop could be migrated to another host as a last resort. However, the majority of users will not experience the migration of their Cloud desktops and the system has a more optimal number of hosts for most time periods, thus efficiently allocating host server resources.

Another example of optimizing allocation associated with the example method may occur in cases where a worker does not follow their normal shift pattern at all. For example, a user may be normally associated with a morning shift, either by information found in the Configuration Repository 372 and/or usage history tracked in Event Data Repository 370. However, the user may sometimes work an evening shift for some reason. By analyzing log on times that may be outliers significantly out of the bounds of the identified morning shift, the system may dynamically adjust the affinity of the user to treat the user as temporarily belonging to the evening shift and use this information to allocate the optimal number of hosts.

Additional analysis may be performed by the example host allocation engine to further increase efficiency in host allocation. For example, by analyzing usage patterns it may be possible to identify outliers among users that require dedicated resources. For example, if a subset of users can be identified to have unusual CPU or memory demands because of the applications they run, and the timing of these application uses, the engine may allocate the cloud desktops for these users to dedicated hosts or possibly a dedicated cluster of hosts to provide sufficient resources to the unusual applications. For example, the host allocation engine 362 may have identified a subset of users that require additional memory, by considering information in configuration repository 372 and/or event data, including memory utilization and history of run-time errors related to memory allocation, that may be stored event data repository 370. This analysis can be used allocate hosts in such a manner that accommodates fewer cloud desktops on each host in the cluster or uses an alternative cluster of hosts that have different memory configurations.

Figure 9:
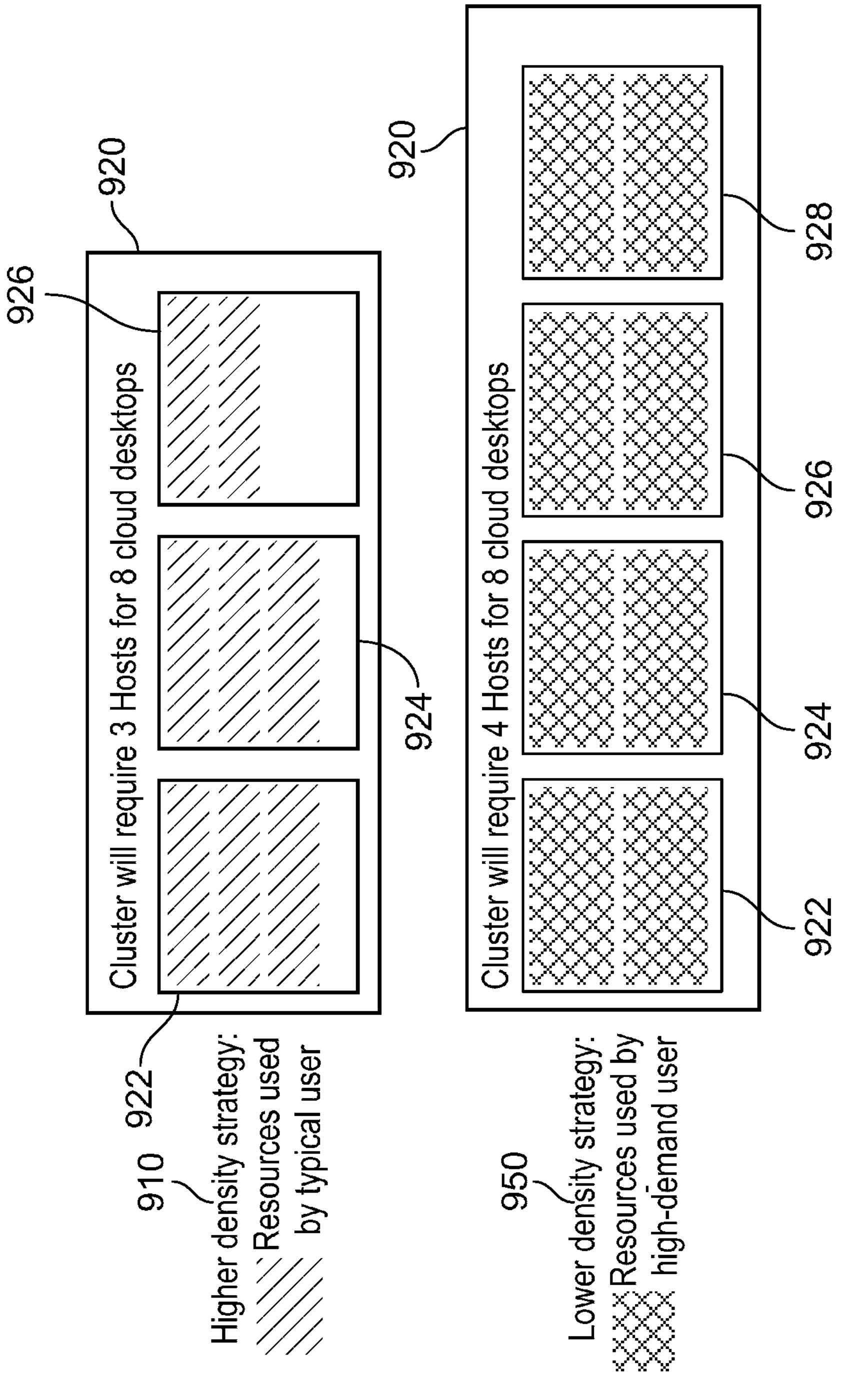
FIG. 9 is a chart of a high density and a low density allocation strategy incorporating usage data.

FIG. 9 shows two different strategies 910 and 950 for managing the density of cloud desktops for a given cluster 920. In a first strategy 910, the cluster 920 allocates three hosts 922, 924, and 926 for eight Cloud desktops. The shaded areas of each of the hosts 922, 924, and 926 represent the resources necessary to provision desktops. Thus, the hosts 922 and 924 provision three desktops, while the host 926 provisions two desktops. In the second strategy 950, the cluster allocates an additional host 928 for more resource heavy users. Thus, each of the hosts 922, 924, 926, and 928 provision two desktops. However, the two desktops for each of the hosts consume comparatively more resources as they represent the more resource heavy users than normal users in the first strategy 910. Thus, the first strategy 910 is a relatively higher density strategy in comparison to a lower density strategy of the second strategy 950. The key is that in depth knowledge of application uses is something typically not visible to host allocation engines associated with cloud providers.

Similarly, usage pattern analysis may discover seasonality in the use of resources that provides more allocation hints than simply shift affiliation, similar to the way other computing scaling systems work. For example, some users may require much more processing around certain time periods. One illustrative example is financial workers who can be expected to require additional cloud desktop resources (such as CPU/memory/hours of use) around monthly, quarterly, or annual deadlines, or major planned events (such as a commercial sales event). Such cloud desktops could be affiliated with dedicated hosts that can reduce the need to load balance a cluster supporting users without this usage pattern. This is another scenario where the Cloud desktop service may use knowledge of the expected resource demand to affect the strategy for allocating hosts to a cluster. In this example, the more low density strategy in FIG. 9 may be employed at certain time periods of more resource intensive usage. The key here is that in the case of virtual desktops, only a cloud desktop service system has knowledge about user activities and can predict the impact on or provide input to host allocation routines.

When a Cloud provider requires that the Cloud desktop service manage virtual desktop hosts, it avoids creating and maintaining unneeded Cloud desktop hosts over longer periods of time. The example system also avoids unnecessary migration of users between hosts that can impact user experience. Unlike allocation engines that are based on dynamic CPU and memory utilization and scheduler wait time, and rely on dynamic load balancing, the example method allows better allocation at Cloud desktop creation time, minimizing the need for Cloud desktop migration between hosts.

Figure 10:
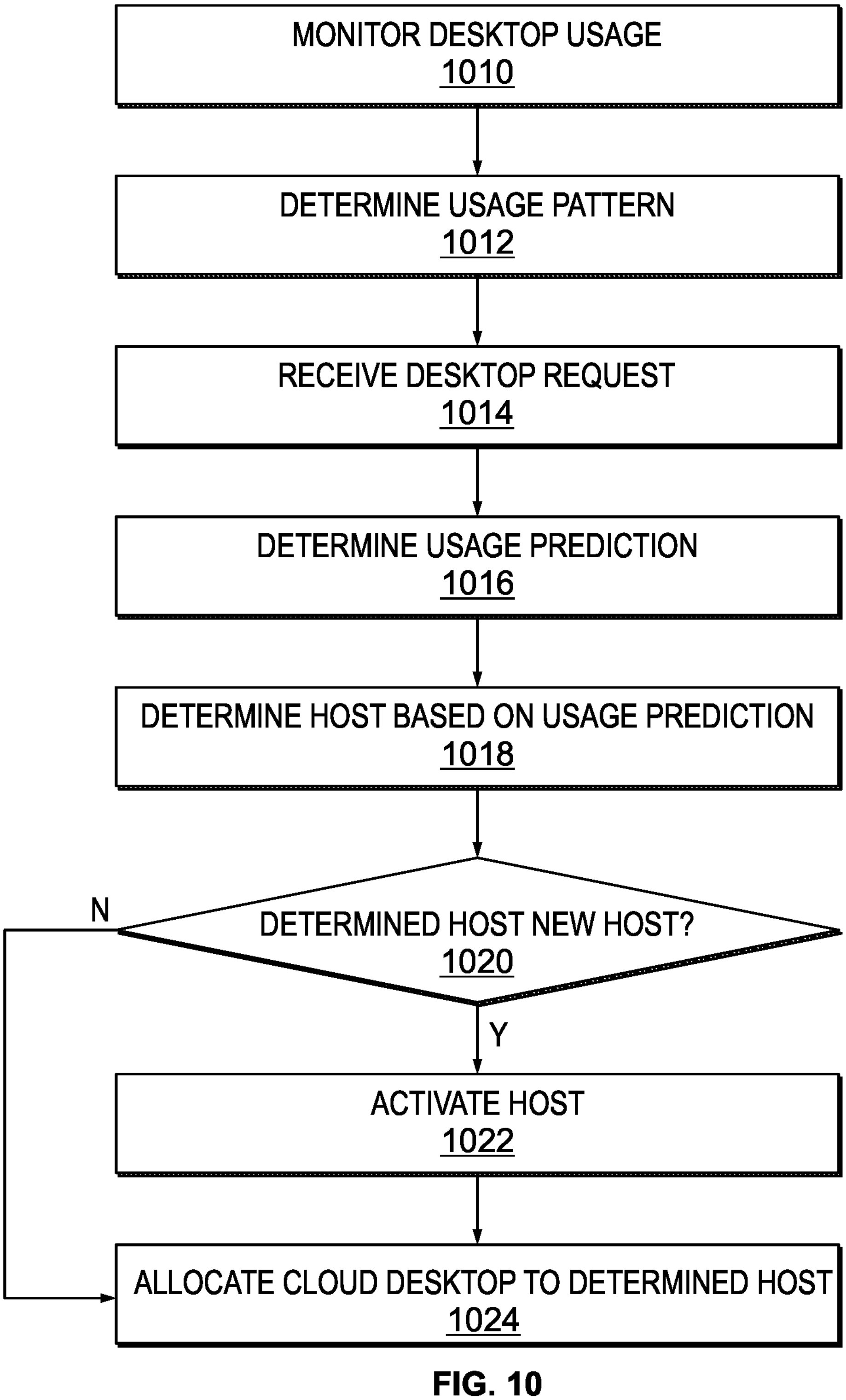
FIG. 10 is a flow diagram of the collection and allocation routine of the example balancing engine.

FIG. 10 is a flow diagram of a routine to allocate of cloud desktops to different host servers based on usage patterns. In this example, the machine readable instructions comprise an algorithm for execution by: (a) a processor, (b) a controller, and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIG. 9, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The routine collects user data and data relevant to usage patterns for users of Cloud desktops (1010). The routine then determines a relevant pattern of Cloud desktop usage such as a schedule for user log ons of the Cloud desktops (1012). A request for a new Cloud desktop is received (1014). The routine determines usage information affiliated with the user who makes the request for the cloud desktop and determines a prediction as to the usage of the Cloud desktop of the user who is requesting the Cloud desktop (1016). The routine then determines a host to provide the Cloud desktop based on the usage prediction (1018).

The routine then checks whether the determined host is the existing host or a new host that needs to be activated from the host determination (1020). If a new host is required, the routine activates a new host (1022). The routine then assigns the new Cloud desktop to the host (1024). If the host is an existing host, the new Cloud desktop is assigned to the existing host (1024).

Figure 11:
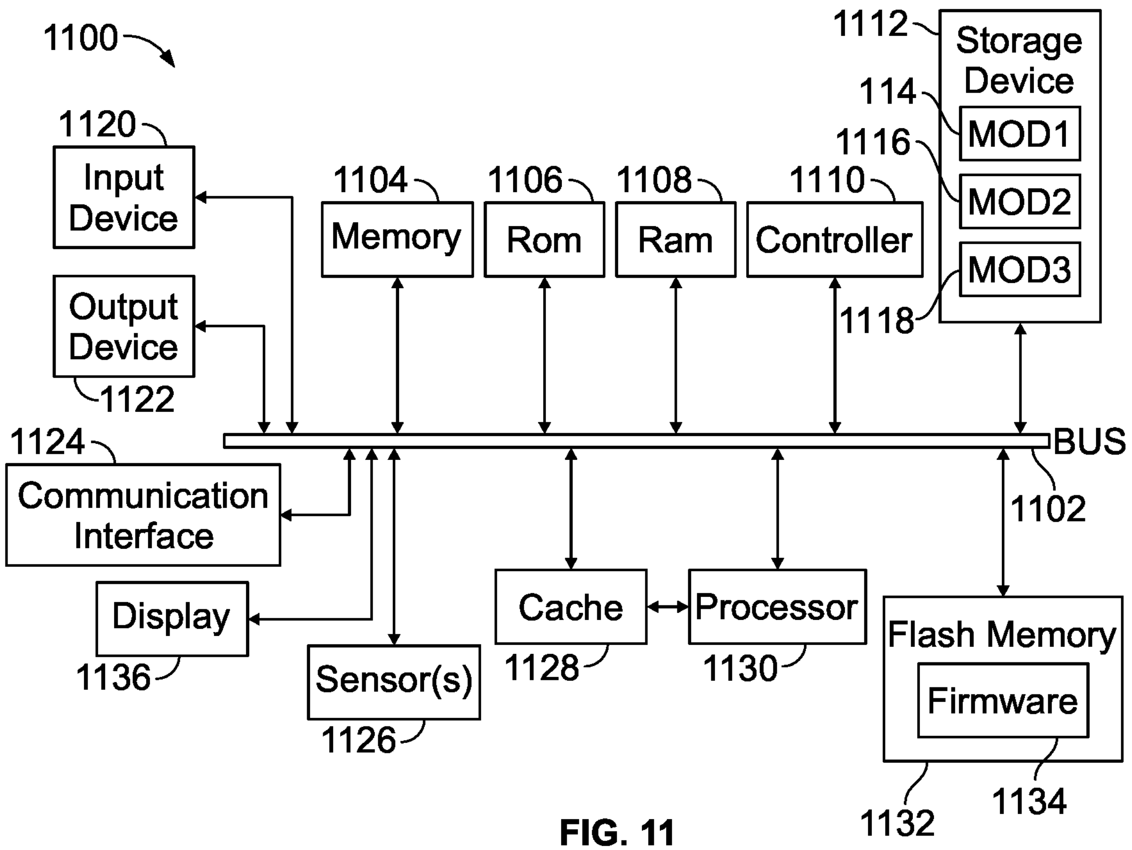
FIGS. 11 and 12 illustrate exemplary systems in accordance with various examples of the present disclosure.
Figure 12:
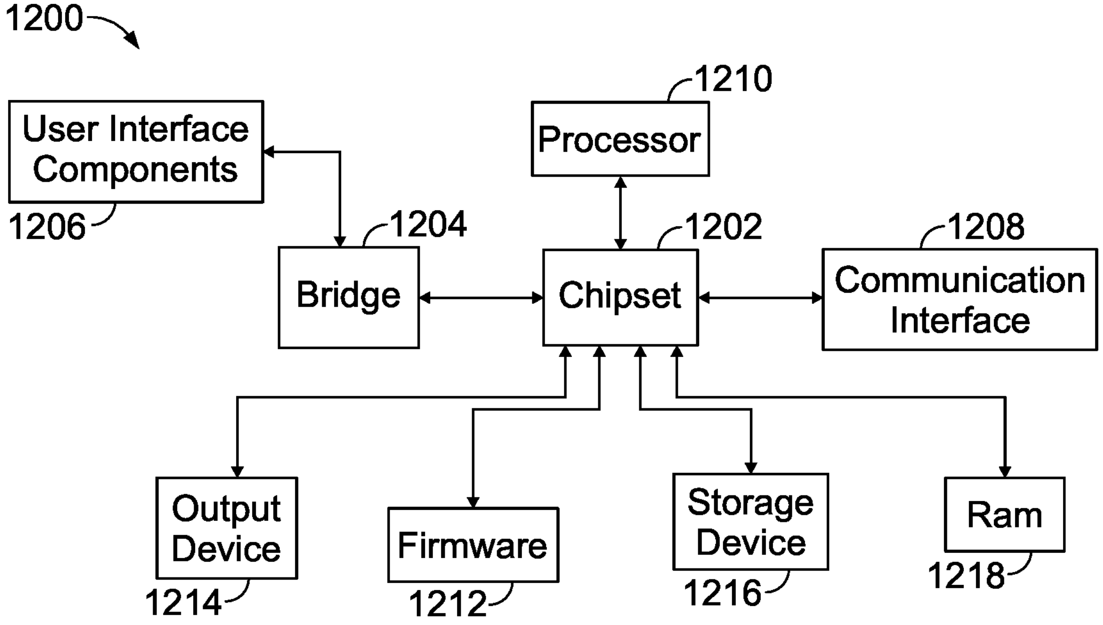

FIGS. 11-12 illustrate an example computing system 1100, in which the components of the computing system are in electrical communication with each other using a bus 1102. The system 1100 includes a processing unit (CPU or processor) 1130 and a system bus 1102 that couple various system components, including the system memory 1104 (e.g., read only memory (ROM) 1106 and random access memory (RAM) 2008), to the processor 1130. The system 1100 can include a cache of high-speed memory connected directly with, in close proximity to, or integrated as part of the processor 1130. The system 1100 can copy data from the memory 1104 and/or the storage device 1112 to the cache 1128 for quick access by the processor 1130. In this way, the cache can provide a performance boost for processor 1130 while waiting for data. These and other modules can control or be configured to control the processor 1130 to perform various actions. Other system memory 1104 may be available for use as well. The memory 1104 can include multiple different types of memory with different performance characteristics. The processor 1130 can include any general purpose processor and a hardware module or software module, such as module 1 1114, module 2 1116, and module 3 1118 embedded in storage device 1112. The hardware module or software module is configured to control the processor 1130, as well as a special-purpose processor where software instructions are incorporated into the actual processor design. The processor 1130 may essentially be a completely self-contained computing system that contains multiple cores or processors, a bus, memory controller, cache, etc. A multi-core processor may be symmetric or asymmetric.

To enable user interaction with the computing device 1100, an input device 1120 is provided as an input mechanism. The input device 1120 can comprise a microphone for speech, a touch-sensitive screen for gesture or graphical input, keyboard, mouse, motion input, and so forth. In some instances, multimodal systems can enable a user to provide multiple types of input to communicate with the system 1100. In this example, an output device 1122 is also provided. The communications interface 1124 can govern and manage the user input and system output.

Storage device 1112 can be a non-volatile memory to store data that is accessible by a computer. The storage device 1112 can be magnetic cassettes, flash memory cards, solid state memory devices, digital versatile disks, cartridges, random access memories (RAMs) 2008, read only memory (ROM) 1106, and hybrids thereof.

The controller 1110 can be a specialized microcontroller or processor on the system 1100, such as a BMC (baseboard management controller). In some cases, the controller 1110 can be part of an Intelligent Platform Management Interface (IPMI). Moreover, in some cases, the controller 1110 can be embedded on a motherboard or main circuit board of the system 1100. The controller 1110 can manage the interface between system management software and platform hardware. The controller 1110 can also communicate with various system devices and components (internal and/or external), such as controllers or peripheral components, as further described below.

The controller 1110 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 1110 to initiate or conduct specific hardware recovery procedures or operations, as further described below.

The controller 1110 can also include a system event log controller and/or storage for managing and maintaining events, alerts, and notifications received by the controller 1110. For example, the controller 1110 or a system event log controller can receive alerts or notifications from one or more devices and components, and maintain the alerts or notifications in a system event log storage component.

Flash memory 1132 can be an electronic non-volatile computer storage medium or chip that can be used by the system 1100 for storage and/or data transfer. The flash memory 1132 can be electrically erased and/or reprogrammed. Flash memory 1132 can include EPROM (erasable programmable read-only memory), EEPROM (electrically erasable programmable read-only memory), ROM, NVRAM, or CMOS (complementary metal-oxide semiconductor), for example. The flash memory 1132 can store the firmware 1134 executed by the system 1100 when the system 1100 is first powered on, along with a set of configurations specified for the firmware 1134. The flash memory 1132 can also store configurations used by the firmware 1134.

The firmware 1134 can include a Basic Input/Output System or equivalents, such as an EFI (Extensible Firmware Interface) or UEFI (Unified Extensible Firmware Interface). The firmware 1134 can be loaded and executed as a sequence program each time the system 1100 is started. The firmware 1134 can recognize, initialize, and test hardware present in the system 1100 based on the set of configurations. The firmware 1134 can perform a self-test, such as a POST (Power-On-Self-Test), on the system 1100. This self-test can test the functionality of various hardware components such as hard disk drives, optical reading devices, cooling devices, memory modules, expansion cards, and the like. The firmware 1134 can address and allocate an area in the memory 1104, ROM 1106, RAM 1108, and/or storage device 1112, to store an operating system (OS). The firmware 1134 can load a boot loader and/or OS, and give control of the system 2000 to the OS.

The firmware 1134 of the system 1100 can include a firmware configuration that defines how the firmware 1134 controls various hardware components in the system 1100. The firmware configuration can determine the order in which the various hardware components in the system 1100 are started. The firmware 1134 can provide an interface, such as an UEFI, that allows a variety of different parameters to be set, which can be different from parameters in a firmware default configuration. For example, a user (e.g., an administrator) can use the firmware 1134 to specify clock and bus speeds, define what peripherals are attached to the system 1100, set monitoring of health (e.g., fan speeds and CPU temperature limits), and/or provide a variety of other parameters that affect overall performance and power usage of the system 1100. While firmware 1134 is illustrated as being stored in the flash memory 1132, one of ordinary skill in the art will readily recognize that the firmware 1134 can be stored in other memory components, such as memory 1104 or ROM 1106.

System 1100 can include one or more sensors 1126. The one or more sensors 1126 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 1126 can communicate with the processor, cache 1128, flash memory 1132, communications interface 1124, memory 1104, ROM 1106, RAM 1108, controller 1110, and storage device 1112, via the bus 1102, for example. The one or more sensors 1126 can also communicate with other components in the system via one or more different means, such as inter-integrated circuit (I2C), general purpose output (GPO), and the like. Different types of sensors (e.g., sensors 1126) on the system 1100 can also report to the controller 1110 on parameters, such as cooling fan speeds, power status, operating system (OS) status, hardware status, and so forth. A display 1136 may be used by the system 1100 to provide graphics related to the applications that are executed by the controller 1110.

FIG. 12 illustrates an example computer system 1200 having a chipset architecture that can be used in executing the described method(s) or operations, and generating and displaying a graphical user interface (GUI). Computer system 1200 can include computer hardware, software, and firmware that can be used to implement the disclosed technology. System 1200 can include a processor 1210, representative of a variety of physically and/or logically distinct resources capable of executing software, firmware, and hardware configured to perform identified computations. Processor 1210 can communicate with a chipset 1202 that can control input to and output from processor 1210. In this example, chipset 1202 outputs information to output device 1214, such as a display, and can read and write information to storage device 1216. The storage device 1216 can include magnetic media, and solid state media, for example. Chipset 1202 can also read data from and write data to RAM 1218. A bridge 1204 for interfacing with a variety of user interface components 1206, can be provided for interfacing with chipset 1202. User interface components 1206 can include a keyboard, a microphone, touch detection, and processing circuitry, and a pointing device, such as a mouse.

Chipset 1202 can also interface with one or more communication interfaces 1208 that can have different physical interfaces. Such communication interfaces can include interfaces for wired and wireless local area networks, for broadband wireless networks, and for personal area networks. Further, the machine can receive inputs from a user via user interface components 1206, and execute appropriate functions, such as browsing functions by interpreting these inputs using processor 1210.

Moreover, chipset 1202 can also communicate with firmware 1212, which can be executed by the computer system

1200 when powering on. The firmware 1212 can recognize, initialize, and test hardware present in the computer system 1200 based on a set of firmware configurations. The firmware 1212 can perform a self-test, such as a POST, on the system 1200. The self-test can test the functionality of the various hardware components 1202-1218. The firmware 1212 can address and allocate an area in the memory 1218 to store an OS. The firmware 1212 can load a boot loader and/or OS, and give control of the system 1200 to the OS. In some cases, the firmware 1212 can communicate with the hardware components 1202-1210 and 1214-1218. Here, the firmware 1212 can communicate with the hardware components 1202-1210 and 1214-1218 through the chipset 1202, and/or through one or more other components. In some cases, the firmware 1212 can communicate directly with the hardware components 1202-1210 and 1214-1218.

It can be appreciated that example systems 1100 (in FIG. 11) and 1200 can have more than one processor (e.g., 1130, 1210), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware, generalized hardware made specialized by the execution of software thereon that enables the hardware to perform specific function, software stored on a computer-readable medium, or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A cloud desktop system comprising:

a plurality of available host servers for executing cloud desktops accessible to client devices operated by a plurality of users via a network;

a monitoring service coupled to the plurality of available host servers via the network, the monitoring service operable to collect usage data from the host servers or the client devices related to the plurality of users that are provided access to the cloud desktops;

a host allocation engine coupled to the monitoring service and plurality of available host servers, the host allocation engine operable to:

receive a request for a cloud desktop from a client device operated by a new user via the network while a first subset of the plurality of available host servers are executing cloud desktops accessed to the client devices of a first subset of the plurality of users during a first shift of a first period of time when the first subset of users use the cloud desktops, wherein at least one of the first subset of the plurality of available host servers has a capability to execute the requested cloud desktop;

determine previous usage data for the new user requesting the cloud desktop from a storage device storing the previous usage data, the previous usage data collected by the monitoring service, wherein the previous usage data for the new user indicates the new user is associated with a second shift having a second different period of time when a second plurality of users use the cloud desktops;

allocate a new host server from a second subset of the plurality of available host servers to execute a new cloud desktop accessible to the client device operated by the new user, from the plurality of available host servers not in the first subset of the plurality of servers to avoid allocating any of the first subset of the plurality of servers, based on the usage data of the new user and the usage data collected from the plurality of users; and deallocate the first subset of host servers from executing the cloud desktops for the first subset of the plurality of users at a subsequent time period after the first shift ends.

2. The system of claim 1, wherein the usage data for the user is a usage profile belonging to a plurality of usage profiles, wherein at least one of the plurality of usage profiles is associated with each of the plurality of users.

3. The system of claim 1, wherein one of the second subset of host servers of the plurality of host servers is dedicated to the user.

4. The system of claim 1, wherein the usage data include seasonal usage.

5. The system of claim 1, wherein the usage data include the role of the user.

6. The system of claim 1, wherein a user classified as part of a shift may be dynamically associated with another shift.

7. The system of claim 1, wherein the plurality of available servers include at least one idle server and at least one active server providing cloud desktops, wherein the allocation of servers is based on minimizing the number of active servers of the plurality of servers.

8. A method for assigning a cloud desktop to one of a plurality of host servers for executing cloud desktops accessible to client devices operated by a plurality of users via a network, the method comprising:

collecting usage data from the host servers or the client devices related to the plurality of users that are provided access to the cloud desktops executed by the plurality of hosts;

determining at least one usage pattern based on collected usage data;

receiving a request for a cloud desktop from a client device operated by a new user via the network while a first subset of the plurality of available host servers are executing cloud desktops accessed to the client devices of a first subset of the plurality of users during a first shift of a first period of time when the first subset of users use the cloud desktops, wherein at least one of the first subset of the plurality of available host servers has a capability to execute the requested cloud desktop;

accessing previous usage data for the new user requesting the cloud desktop from a storage device storing the previous usage data, the previous usage data collected by the monitoring service, wherein the previous usage data for the new user indicates the new user is associated with a second shift having a second different period of time when a second plurality of users use the cloud desktops;

allocating a new host server from a second subset of the plurality of available host servers to execute a new cloud desktop accessible to the client device operated by the new user, from the plurality of available host servers not in the first subset of the plurality of host servers to avoid allocating any of the first subset of the plurality of servers, based on a usage pattern associated with the new user and the plurality of users; and deallocating the first subset of host servers from executing the cloud desktops for the first subset of the plurality of users at a subsequent time period after the first shift ends.

9. The method of claim 8, wherein the usage data for the user is a usage profile belonging to a plurality of usage profiles, wherein at least one of the plurality of usage profiles is associated with each of the plurality of users.

10. The method of claim 8, wherein one of the second subset of host servers of the plurality of host servers is dedicated to the user.

11. The method of claim 8, wherein the usage data include seasonal usage.

12. The method of claim 8, wherein the usage data include the role of the user.

13. The method of claim 8, wherein a user classified as part of a shift may be dynamically associated with another shift.

14. The method of claim 8, wherein the plurality of available servers include at least one idle server and at least one active server providing cloud desktops, wherein the allocation of servers is based on minimizing the number of active servers of the plurality of servers.

15. A non-transitory computer-readable medium having machine-readable instructions stored thereon, which when executed by a processor, cause the processor to:

collect usage data for a plurality of users of cloud desktops provided by the plurality of hosts;

determine at least one usage pattern based on collected usage data;

receive a request for a cloud desktop from a client device operated by a new user while a first subset of the plurality of available host servers are executing cloud desktops accessed to the client devices of a first subset of the plurality of users during a first shift of a first period of time when the first subset of users use the cloud desktops, wherein at least one of the first subset of the plurality of available host servers has a capability to execute the requested cloud desktop;

determine previous usage data for the new user requesting the cloud desktop from a storage device storing the previous usage data, the previous usage data collected by the monitoring service, wherein the previous usage data for the new user indicates the new user is associated with a second shift having a second different period of time when a second plurality of users use the cloud desktops;

allocate a new host server from a second subset of the plurality of available host servers to execute a new cloud desktop accessible to the client device operated by the new user, from the plurality of available host servers not in the first subset of the plurality of servers to avoid allocating any of the first subset of the plurality of servers, based on the usage data of the new user and the usage data collected from the plurality of users; and deallocate the first subset of host servers from executing the cloud desktops for the first subset of the plurality of users at a subsequent time period after the first shift ends.

* * * * *